United States Patent
Austin

Patent Number: 5,445,080
Date of Patent: Aug. 29, 1995

[54] FREE RANGING MONOTRACK SORTVEYOR WITH SELECTIVELY LOCKABLE ARTICLE CARRYING TILT TRAY

[76] Inventor: Robert Austin, 8014 Madeira Ct. S., Orlando, Fla. 32836

[21] Appl. No.: 138,972

[22] Filed: Oct. 21, 1993

[51] Int. Cl.⁶ .............................. B61B 13/04
[52] U.S. Cl. .................... 104/119; 105/144; 105/239; 105/241.1; 414/350; 414/384
[58] Field of Search ............ 104/118, 119, 243, 244; 105/101, 141, 144, 239, 241.1, 241.2, 247; 198/365, 475.1, 798; 414/350, 383, 384, 470, 598; 238/14.05

[56] References Cited

U.S. PATENT DOCUMENTS

| | | | |
|---|---|---|---|
| 2,830,768 | 4/1958 | Boaz | 238/14.05 |
| 3,495,545 | 2/1970 | Radovic | 198/798 X |
| 3,613,916 | 10/1971 | Bradbury | 105/244.2 X |
| 4,089,404 | 5/1978 | Venzke | 198/365 |
| 4,248,157 | 2/1981 | Evans | 104/95 X |
| 4,471,867 | 9/1984 | Forshee | 104/111 X |
| 4,722,430 | 2/1988 | Canziani | 198/365 |
| 4,726,464 | 2/1988 | Canziani | 198/365 |
| 5,018,928 | 5/1991 | Hartlepp | 414/350 X |
| 5,235,917 | 7/1993 | Lück et al. | 104/119 |

Primary Examiner—Robert J. Oberleitner
Assistant Examiner—S. Joseph Morano

[57] ABSTRACT

The invention is a monotract conveyor which has a pivotal tray which is selectively lockable to either pivot to either side of a track which the conveyor runs on, or to stay in an upright position. The tray is mounted to an upper portion of the conveyor unit which is mounted to the main body of the unit by a male/female key member connection. This connection enables one end of the upper portion to be lifted from lower portion, while the key members lock the upper and lower portions of the other end together.

5 Claims, 3 Drawing Sheets

FREE RANGING MONOTRACK SORTVEYOR WITH SELECTIVELY LOCKABLE ARTICLE CARRYING TILT TRAY

SUMMARY OF THE INVENTION

The invention described herein is designed to replace package conveyor and tilt tray sorters in many applications and provide the combined benefits of both, previously unavailable in the industry, while eliminating the negative aspects typical of current conveyance and sortation systems. The invention is also referred to herein as the system or FRIMS (Free Ranging Intelligent Monotrack Sortveyor). The systems low cost makes it affordable to the smallest businesses, its lightweight construction allows installation in areas till now thought unusable and its "out of the box" system design with completely integrated controls provides true connect power and run simplicity even for complex and large layouts. The system provides both automated conveyance and sortation of a wide range of size and weight items.

The system components are injection molded out of high strength lightweight plastic and do not require precision machining or complex assembly. The system is designed from pre-engineered standard components, listed below, which when chosen for the specific application, provide a quickly installed and working solution to many material handling problems.

Monotract (MT) components
staights
curves
incline/decline sections
left/right divert/merge modules (DMM)
45 degree lift; lift bar, drive, chain
drop tray restore bar
safety netting and supports
track to track power/data cables
mechanical track couplers and floor/wall/ceiling supports
location tags
   Tow Vehicles (TV)
   Slave Vehicles (SV)
   System control components

DETAILED DESCRIPTION OF THE INVENTION

Figure 1:
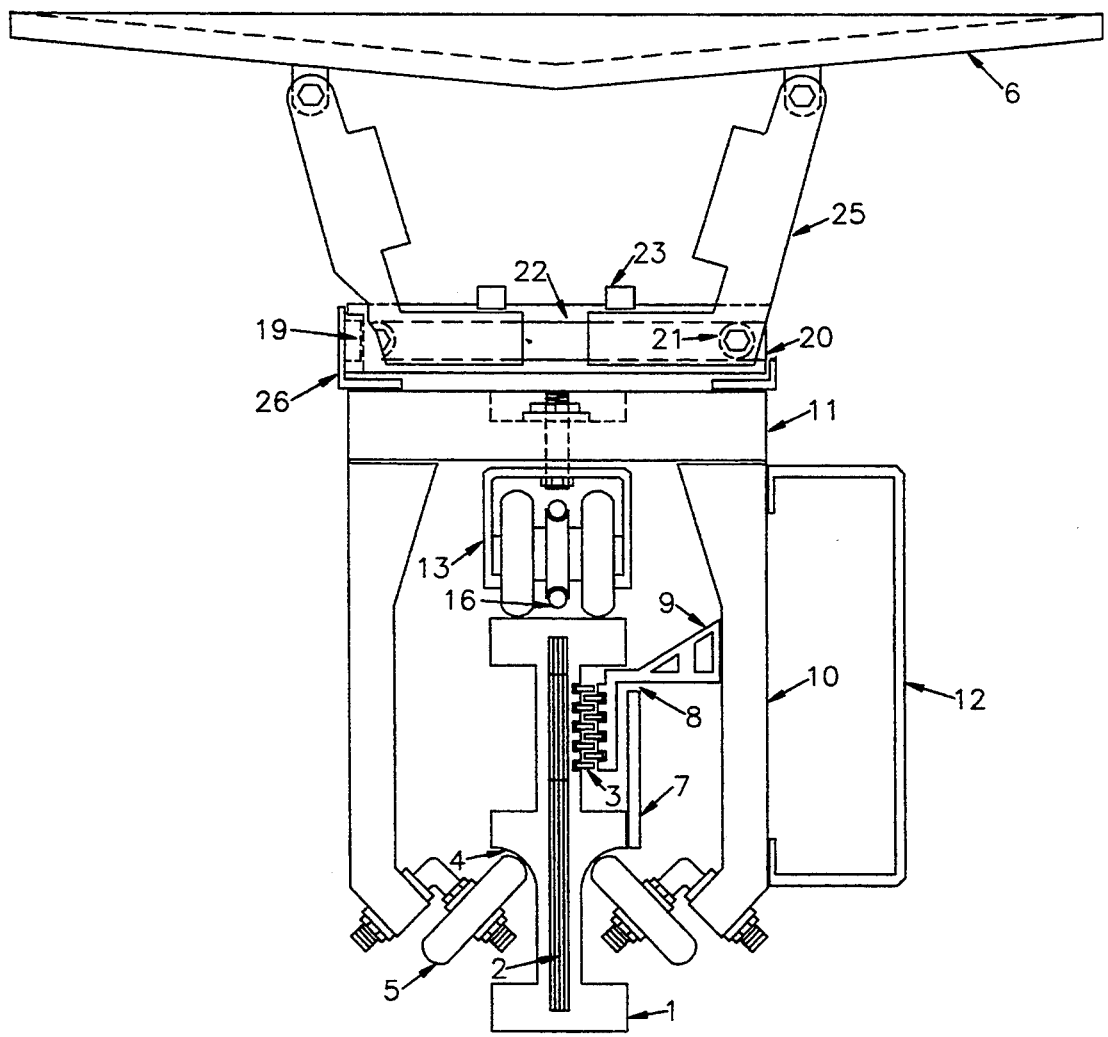
FIG. 1 illustrates the front view of the track and tow vehicle (looking into the track).

The MT 1 is I-beam shaped and is molded from structural plastic around a half inch thick plywood vertical core 2. Power and data conductors 3 are imbedded within the MT. The MT includes a rounded rib section 4 which provides lateral stiffness and a curved track for the vehicle side mounted wheels 5. Standard straight track is ten feet long and may be simply cut to required length in the field during installation or relayout. The cut end requires coupling/mounting holes to be drilled (using a standard template). At the end of each side of track a cutout is provided which exposes a small portion of the power/data conductors located on the opposite side. A connector is attached to the conductors and track which allows a short prefabricated cable to be quickly attached in the field to connect track sections electrically and to extract power and data for local use (i.e., to power divert modules, 45 degree lift drive or a local data terminal). This feature eliminates all on-site custom electrical wiring except for power source to track connections.

Tow vehicles (TV) and slave vehicles (SV,s) straddle the track from the top. A single TV will tow behind it up to five SV,s. The TV and its attached SV,s are also referred to as "unit" herein. Each vehicle (TV&SV) has a drop (or fall away) tray attached. Track mounting/coupling components are attached to the bottom of the track for floor, ceiling and wall installation.

Right and left 90 degree curve sections are similar in construction to the MT straight and may also be cut in the field to produce other desired angles.

Divert/Merge Modules (DMM) installed in the system allow vehicles to leave the main path, travel a secondary route and then merge back into the main path. The DMM is of universal construction and may be easily configured for right or left divert and right or left merge. The DMM breaks the main path temporarily connecting it to the secondary path. The DMM is controlled by the TV. Once the TV and its SV,s have totally entered the secondary path (or have merged completely into the main path) the DMM is restored to its original position.

The 45 degree lift components allow the vehicles to incline or decline at an angle of forty five degrees while the vehicle drop tray and its contents remain level. The incline requires a geared motor drive while one is necessary for decline. The lift motor is powered from the track eliminating the need to run wire and conduit. The TV drives into the lift chain, engages the chain and is transported up the incline until the entire unit is level and is then automatically disengaged. A lift bar is installed on the inclined portion of the track which mechanically lifts one side of the drop tray as the vehicles incline. A similar bar is provided on the decline section of track. Standard 45 degree incline/decline track sections are used to make the transition from level to 45 degrees and then back to level. The ability to incline and decline at a forty five degree angle allows for rapid decent into a work zone (and ascent out of the zone) reducing wasted floor space typical of conveyor and tilt tray sorter products which do not safely exceed 15 degrees.

Track couplers are pre-engineered to fit the MT shape and rapidly connect to the floor/wall/ceiling mounting brackets similarly engineered to take advantage of the lightweight nature of the track. In installations above 7'6" inches where personnel may be working, net attachment brackets may be quickly installed on the track to allow low cost netting to be installed. The netting catches any product which may fall off of a drop tray.

The TV reads its location on the track optically using an onboard photoeye. Optical tags are strategically placed onto the track typically prior to divert/merge modules or in a area where the drop trays will be activated. A distance encoder allows the TV to "dead reckon" from optical tags so that the TV knows its location in the system at all times.

The vehicles ride the top of the track where most of the weight of the vehicles and load is placed. The four outrigger wheels 5 stabilize the vehicle and attach it to the track. Since the drop tray 6 is wider than the vehicle carriage, loads placed off center on the tray will transmit some weight into the center of the track. The track is injection molded out of structural plastic around a plywood core and is designed to accept the tortional and vertical forces. The plywood core provides vertical stiffness reducing deflection dramatically without adding weight. The MT has an I-beam shape and a centrally located rib 4 with a curved section on each side of the track. The rib provides additional tortional stiffness and a track for the vehicles side mounted outrigger wheels 5. The monotrack 1 design incorporates integral power and data conductors 3. A plastic insulating cover 7 attaches to the track to isolate the conductors from people or other objects. A small space 8 left between the cover and the track allows the pickup brush assembly to exit from under the cover. The space 8 does not allow fingers to enter and the arrangement of the conductors places the hot conductor the farthest distance from the space making it nearly impossible for even a narrow tool to contact power. Openings designed into opposite sides of the tract at each end expose the power/data conductors. A connector attaches to the conductors and the track. After track sections are connected mechanically they are electrically connected using short prefabricated cables with connectors on both sides. The TV has two brush pickup assemblies 9 connected in parallel which ensure continuous electrical connection to the track even when passing over MT junctions and during divert and merge.

2) Tow Vehicle (TV): The TV is assembled from multiple injection molded components. The basic vehicle body has two sides 10 and a top plate 11. The sides are identical in construction and attach to the top plate using standard bolt and nut construction. Each side contains two polyurethane wheels 5 with round tread. The side (or outrigger) wheels 5 are installed at a 45 degree angle into the round track. The wheel assemblies may rotate within the side 10 to allow the wheel to follow the track during incline and decline transition. The side wheels normally press against the track to ensure that all wheels contact the tract with or without load on the drop tray 6. The TV sides are designed to flex to accomadate off center loading, and to allow transitions such as curves, incline/declines and diverts to be negotiated. The TV electronics are installed in pods 12 which attach to the outer sides of the TV. One of the sides of the TV has attached to it the power/data pickup assemblies 9. These are located on the inner side of the side plate 10. The vehicle top plate 20 contains two wheel assemblies which ride on the top of the MT. The drive wheel assembly 13 consists of a round belt sheave sandwiched between two polyurethane wheels. The non-driven wheel 14 is a single polyurethane wheel. Both wheel assemblies may rotate up to 15 degrees to allow the vehicle to negotiate divers and curves. The variable speed motor drive 15 is attached to the top plate near the drive assembly. Openings are designed into the upper assembly construction allowing the motor to protrude into the space. A round belt 16 attaches the motor drive pulley 17 to the drive wheel assembly. The four corners of the upper assembly are designed as female sockets 18 which fit onto the top plate 11 angle brackets 26 with male key 19. The female sockets accept the four male keys 19. The male/female design allows the upper assembly 20 to lift off the top plate 11 during incline or decline keeping the upper assembly (and produce being conveyed) level. When the rear of the upper assembly 20 lifts, the front of the assembly is mechanically locked onto the top plate 11 through the design of the socket. When the front of the upper assembly lifts the rear is locked in the same manner to the top plate. The male/female design does not allow side to side lifting of the upper assembly 20. It is important to note that in the direction of travel the upper assembly and drop tray 6 are supported by the top plate 11 on its outside ends which prevents packages placed in the front or rear of the drop tray from forcing either end of the upper assembly 20 out of its socket and off of the top plate 11. In order to allow room for the drop tray to drop left or right, the top plate supports the upper assembly from supports placed inside form the outer edges of the drop tray. The socket design prevents non-centered loads placed on the drop tray from forcing the left or right side of the upper assembly 20 sockets free of its mating male keys which are attached to the top plate by angle brackets 26. This is accomplished by the flat surfaces between the male/female junction not allowing twisting. The upper assembly 20 consists of an injection molded plate containing the four female sockets 18 and the drop tray 6. The drop tray is attached to the upper assembly by four wheels 21 which fit into guides 22 located in the front and rear sides of the upper assembly. The guides capitivate the drop tray and allow it to drop either left or right. The upper assembly plate 20 also contains four drop tray locks 23 and two solonoid tray release mechanisms 24. The drop tray vertical supports 25 are connected left to right 27 for stability and to keep the guide wheels aligned and in their track. The vertical supports 25 are attached to the drop tray 6 in a manner which allows the tray to pivot from either side of the supports when the tray is dropped. The drop tray is a nominal 24 by 24 inches. It is designed with a slope towards the center to prevent contents from falling out of the tray. The slope also tends to center tray contents to reduce tortional forces on the track. As shown in FIG. 1.1 the drop tray supports are L-shaped. The lower and smaller portion of the support is parallel to the upper assembly plate when the tray is in the normal non-dropped position. In this position each support is locked 23 into position in two places. When the drop tray release solonoid 24 is activated by the TV, two of the locks are pulled out of the support arm lock position. The drop tray supports wheels of one side of the drop tray are then free to roll in the track. The off center unstable position of the supports in the normal position immediately starts the tray dropping until it is stopped by the locking arm which contacts the center of the tray stopping the tray decent and helping the product slide through this "bumping" action. The length of the locking arm determines the tilt angle of the tray and is adjustable. A spring (not shown) is also provided to pull the tray down. The spring ensures a consistant drop speed especially when the tray is lightly loaded. Drop trays may be dropped either left or right depending upon which of the two solonoids are activated. After passing a group of drop points the trays are restored to their normal position as they drive through tray restore bars mounted to the MT. The restore bars mechanically pull the tray into the normal locked position while preventing the upper assembly from being lifted from its male keys. An angle bracket 28 attached to each side of the upper assembly is held down by an MT mounted fixed wheel while the tray runs across the lift bar. Trays which were not in the dropped position are not affected by the restore bars or the hold down wheel.

The SV,s are identical to the TV,s with the following exceptions. The SV has no motor drive or electronics module. The SV has two single top plate mounted wheels since no double drive wheel is required. Up to five SV,s may be towed behind a TV. The quantity of TV,s and towed SV,s in a specific layout varies according to the through-put rates, load/unload areas and destinations and the scenario of operation. Note that in shuttle car layouts SV,s are also pushed by the TV. Each TV and SV has a spring loaded tow bar (not shown) allowing vehicles to be easily added deleted. These differences reduce the cost of an SV dramatically allowing a single TV and its SV,s to meet higher through-put rates economically. The SV,s are electrically connected to the TV via connectorized prefabricated jumper cables. The TV may then control the drop tray release solonoids located on each SV. All vehicles have a rear mounted reflector used for traffic control purposes allowing each TV in a system to detect other vehicles in its path preventing collisions.

Figure 2:
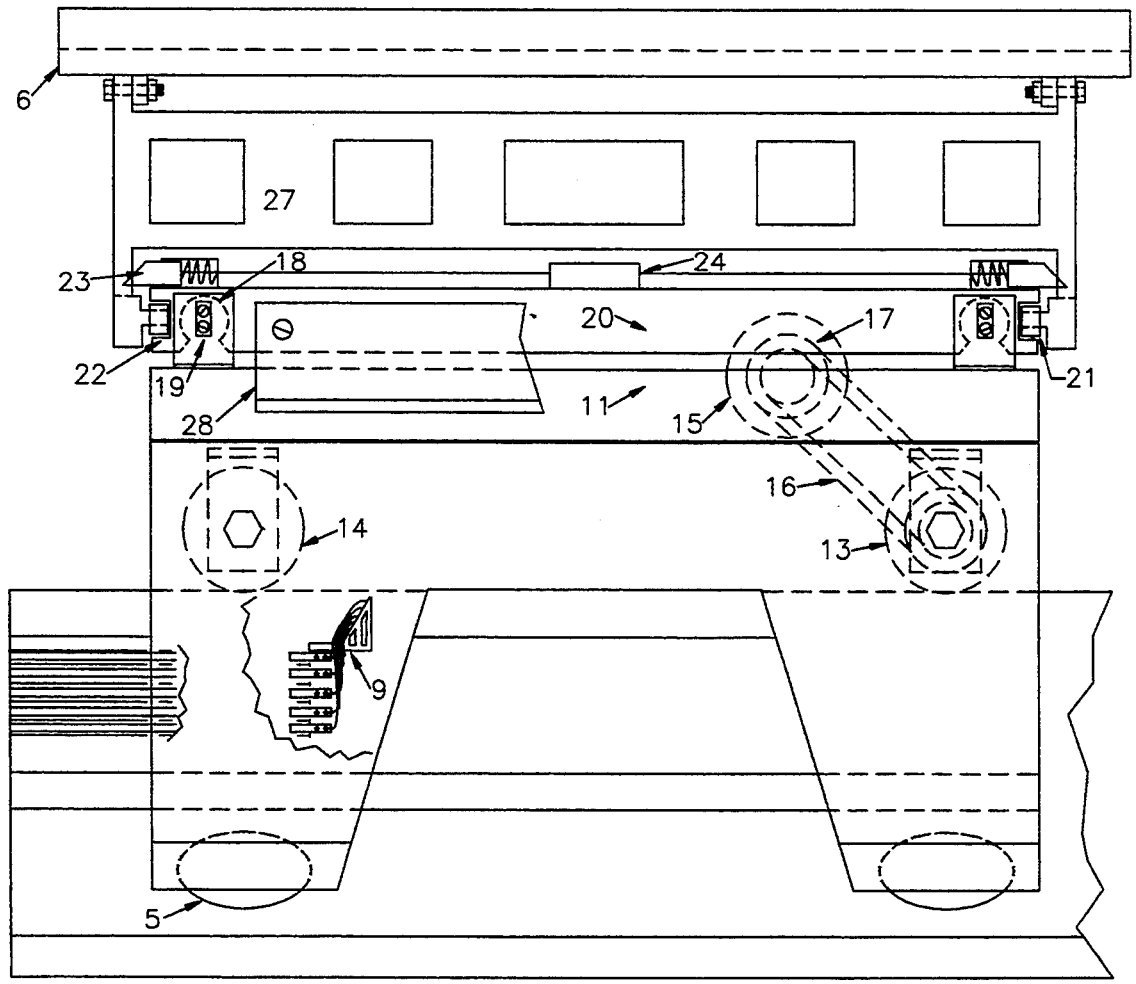
FIG. 2 illustrates the side view of the track and tow vehicle.
Figure 3:
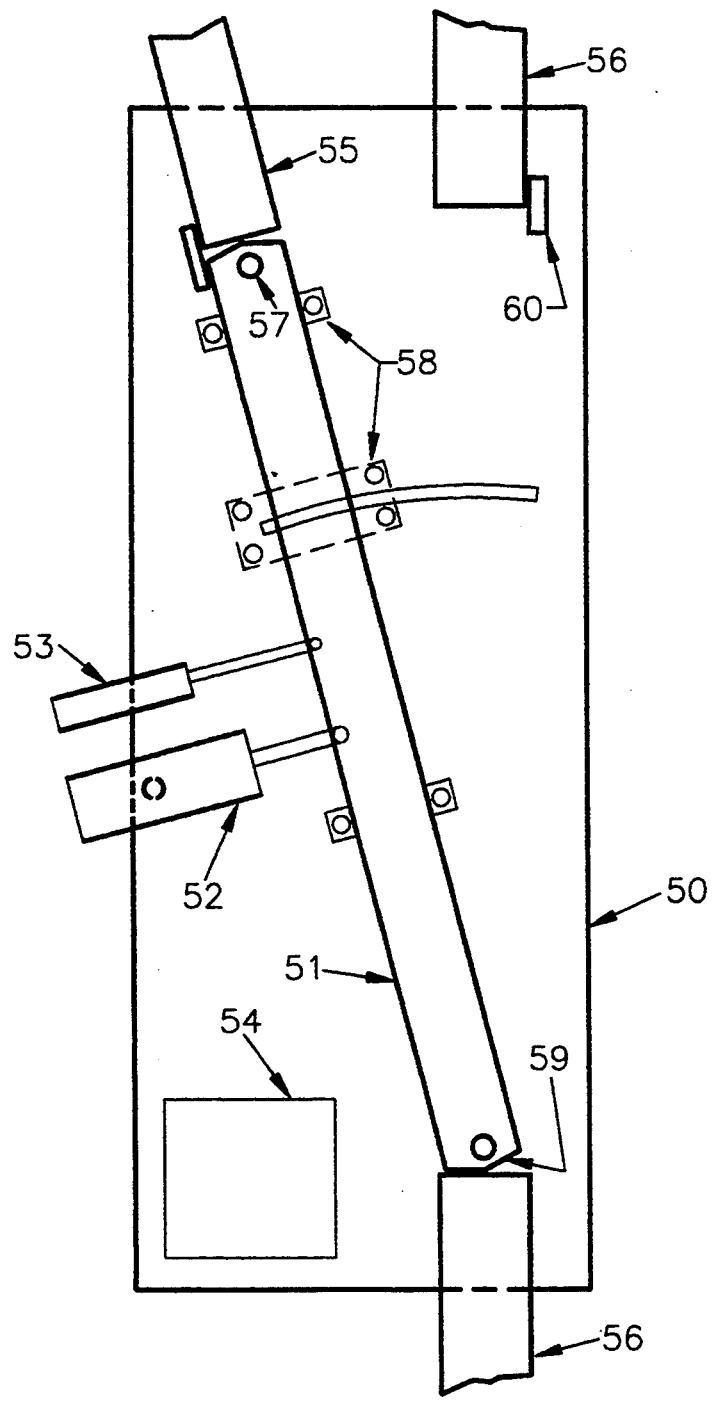
FIG. 3 is a plan view of the DMM set for left divert/right merge.

4) Divert/Merge Module: FIG. 2.0 is a plan view of the DMM. In the orientation illustrated the DMM is configured for left divert or right merge. By flipping the components to the other side of the predrilled plate 50 the same unit becomes a right divert or left merge. The basic components are the universal plate 50, monotract divert arm 51, actuator 52, gas cylinder arm return 53, and electronics module 54. In the position shown, MT section 55 is the entry into a spur or secondary loop. Section 55 may be a MT straight section or MT curve. The section simply bolts onto the plate. A 90 degree MT curve is simply cut to the size required for the desired angle. The main path components 56 are also standard straight or curved MT bolted onto the plate. The divert arm 51 is a modified section of MT. Pivot holes 57 are placed in each end, top and bottom roller/stability guides 58 added and 15 degree cuts 59 made. The pivot holes have a reinforced sleeve inserted. Pivot holes are provided on both sides to allow the arm to be reversed to maintain the power/data conductor on the same side when changing the DMM from left to right divert. The roller guides allow the divert arm to move freely while providing vertical stability. The stops 59 provide proper alignment of the divert arm to the bolted on MT sections. The divert arm ends are cut at a 15 degree angle to allow divert arm motion with minimum gap between sections. The TV/SV wheels pass over the transition both on the top and the sides. The electrical pickup assemblies are also designed to pass over the transition. The pickup brushes are seperated by ¾ inch long "riders" which travel into the next section over the gap before leaving the prior section. Power and data connection is maintained in the divert arm via cables between sections and redundant electrical pickup assemblies ensure continuous connection. The electronics module 54 may be set for one of four operational modes; right divert, left divert, right merge or left merge. Photo-eyes and limit switches connect via prefabricated cables to the module and when installed on the MT sections provide intelligent divert or merge control. The system TV,s communicate with the DMM through the data conductors in the MT. Static devices are also attached to the DMM, such as reflectors, to allow redundant positive TV confirmation of DMM state, open or closed, etc.

5) System controls: In a typical system, a central microprocessor is connected to operator input terminals located in load areas. The terminals are connected to the MT data rails via the end of track connectors. The data terminals are polled by the system MICRO. The MICRO communicates to the TV,s via the data rail imbedded into the MT. In this scenario the micro assigns the TV the destination for each tray it has received from the data terminals and instructs it to leave the pickup area. After dropping tray contents the MICRO assigns the TV to the next area it is needed. The MICRO provides central control, systemwide diagnostics and interface to host computer and other devices (i.e., fixed scanners, scales, etc.). In addition to terminal input, the MICRO may receive destination addresses for item bar codes from a host computer. When the TV and its towed SV,s pass under a scanner the product bar codes and TV identification are passed to the MICRO. The MICOR compares the bar code to the destination it was passed for the code by the host and sends the specific TV the destination of each item on each drop tray. Simpler systems may operate using local keypad entry only with no need for a central MICRO. The keypad would communicate directly with the TV. A TV mounted display and keyboard is also provided. This display/keypad may be used to enter destination addresses for tray contents, release TV/SV,s from a work area and display diagnostics. The display/keypad may be rotated to either side of the TV allowing operation from either side. Each TV has an on-board microprocessor and control components which allow it to operate as an independent unit. Once released from a work area the TV and following SV,s will travel the most efficient route to the tray destinations. The TV will activate diverts and merges, control its own speed and drop tray contents or stop in work areas according to the on board programmed instructions. Whenever layout changes are made the system map stored in each TV is updated via the MT data rails. The MICRO map is first updated and is then instructed to update the map in each TV. The TV map and application programs are stored in battery backup RAM allowing power to be turned off or fail with no need to reprogram the TV(s).

The inherent flexibility of the system allows for unlimited applications and system layout configurations. Combining the features of conveyor systems and tilt tray sortation into one low cost modular self contained system will allow applications which were till now impossible or prohibitive due to current systems size, weight, cost, complexity, noise and other factors described later in this document. Some typical layouts are listed below.

a) Shuttle: The most simple layout is a shuttle from point A to point B and back to point A. Typically one TV and its following SV,s would run on the single path. The addition of "sidings" would allow multiple sets of vehicles to operate on the same path to increase thruput. The vehicles could simply be manually loaded or unloaded or they could be automatically loaded and then drop tray contents into a chute(s) or onto a conveyor(s). Systems with manual unload only do not require the drop tray and will be fitted with fixed trays.

b) Loop: The low cost of track and ease of installation allows most systems to be designed as a continuous loop. A loop systems allows many TV,s to be installed greatly increasing thruput rate and system flexibility. In a loop system vehicles drop tray contents and travel back to pickup points to be loaded. The addition of spurs in which a TV/SV,s diverts off of the main loop into a secondary path and then merges back into the main loop offers additional advantages. The main loop would allow high speed travel while the secondary path would allow the TV to slow down or stop for automatic or manual loading. The secondary path would also allow the TV/SV,s to slow when dropping tray contents reducing problems typical of high speed sorters (trajectory problems) and allow drop points to be much closer. Overall thruput is not affected since secondary spurs do not slow TV speed on the main, higher speed, loop. The main loop may also be installed at a high level while secondary spurs would utilize the 45 degree incline/decline capability of the system. This capability would provide more room in existing facilities and allow smaller new facilities to be built. After divert off of the main loop the TV would decline rapidly at a 45 degree angle into the work area and level off at the work height of 24 to 42 inches (depending on sitting or standing type operations). After processing is complete the unit may incline at a 45 degree angle until level and then merge into the main path.

c) Complex Layout: Multiple loop systems may be interconnected to allow sharing of available TV,S. For example, a receiving to storage subsystem could connect to the picking/shipping loop. Since thruput peaks at different times of the day sharing of TV,s reduces the total TV requirement. Special processing such as transport directly from receiving to shipping docks (cross docking) may also be implemented.

d) Interface with other equipment/systems: Interface to other systems will enhance the capabilities of the invention described and increase the applications. For example, the TV/SV could drop tray contents into a chute. The chute would act as a buffer or accumulation of work for a process. After processing the system would pick up the processed goods and move them to their next destination. Items could also be dropped onto a conveyor and then, after processing, automatically (or manually) loaded from conveyor onto the drop trays. The output from various machines could be loaded onto trays for transport to the input of other machines. An example is a tote storage carousel which could extract totes, place them on the drop trays automatically for distribution as required and then return the totes back into the carousel when dropped off by the system.

Applications for the invention are widewpread. Basically the system may be used wherever package conveyor or tilt tray sorters are sued and many new applications due to the systems ability to combine transport and drop tray sortation, 45 degree incline/decline capability, low cost, lightweight and ease of installation and reconfiguration. A few industry applications are listed below.

a) Flow rack systems; Loading of flow rack is accomplished manually today. This is primarily due to the high cost of accessing every flow rack location (typically hundreds) with current types of systems such a conveyors or tilt tray sorters. This invention allows low cost monotract to be installed for each level of storage and the on-board bidirectional drop tray of the TV and SV,s allows inexpensive sortation into every location. In this manner there is no need for a package conveyor diverter at each location and the associated controls and wiring greatly reducing cost. The drop tray would simply drop tray contents into a small chute leading into the flow rack location. Since the distance between racks on the fill side need not accomodate lift trucks or personnel, racks may be installed closer together increasing storage capacity per square foot of building. An increase of up to 30 percent additional capacity may be realized.

The invention may also be used on the picking side of the flow racks. The MT may be installed within the pick aisle usually in the center of the aisle but may be on one side. The one side installation allows the distance between pick faces to be much less increasing storage capacity. In center located systems the low profile of the MT (8 inches when attached to the floor) allows the pick operator to walk easily over the track allowing one person to access both sides of the aisle in one pick pass where typically two persons or a double pass is required, nearly doubling the pick rate per operator. Space may be left between vehicles and groups of vehicles to further enable the operator to utilize both sides of the rack while vehicles are queued awaiting loading. The TV/SV,s would queue up behind or alongside the operator. The operator would place times onto the drop trays. The drop trays are at a 20 inch elevation when the track is mounted directly to the deck. When the TV unit is completely loaded it would travel directly to the sort areas and deposit tray contents. There is no need for additional diverters or a tilt tray sorter as is required in current systems. The next TV unit would then move into position to be loaded. The TV unit would follow the pick operator along the route by being manually jogged a designated distance or could move to the pick locations on its own displaying on its on-board display the pick instructions.

b) Repair and Maintenance facilities: Typical repair and maintenance facilities have many work centers which perform various operations on parts/assemblies such as inspection, grinding, milling, painting/coating, assembly and storage of replacement parts and the finished and unfinished parts. Most of todays systems use manual labor to push the parts on a cart between areas since conveyors would interfere with the aisles and spaces between the work centers. This invention would allow MT to be installed at a high level out of the way and provide spurs which drop rapidly into and out of the work centers through the use of the 45 degree incline/decline capability. The TV/SV,s would provide automatic transport of the work throughout the facility greatly reducing manpower and increasing overall efficiency. The system MICRO would provide management with accurate reports on material status.

c) Distribution: The invention could replace conveyor and tilt tray sorters in most distribution applications. It would move packages from receiving areas to storage and form storage to packing and shipping consolidation. Typical customers for distribution are the food industry, clothing, discounters, drugs, packages and mail, cargo and freight, greeting cards, books, magazines, cosmetics and many other.

d) Manufacturing: Manufacturing applications are similar to repair and maintenance facilities. The TV units could deliver and remove parts and move assemblies through the manufacturing process. The requirements of JIT could be met by dropping of or picking up parts and assemblies as required by the process. Food processing, tobacco products, electronics, clothing, and nearly every type of product manufactured may have the inventions advantages applied.

e) Office/Hospital: The invention could be used for mail delivery and pickup. It could also deliver food trays and supplies.

f) Entertainment: The units could be used to deliver various items throughout the complex, where it would travel the long tunnels which connect underground. The low cost of monotrack is extremely cost effective wherever long distances need to be spanned. It may also find use inn shows/exhibits.

g) Security: Large areas could be secured by mounting a camera on the TV and allowing it to follow the MT throughout facility areas either inside or out. Less security personnel would be required since walking would be eliminated and multiple cameras could be monitored. The system would be ideal for hazardous area surveillance such as munitions stores, radioactive sites, etc.

h) Small Business: Small automated systems will not be cost effective for small companies. The "system out of a box" concept would allow inexperienced personnel to operate and maintain the systems.

i) Ripouts/backfits: The invention would be ideal for replacing many aging or high maintenance systems currently in use. These type of facilities cannot afford to shutdown. The ability to rapidly install and have working a full up system makes the invention ideal for backfit into existing operations.

j) Non-fixed mechanization: Many users need to reconfigure their systems regulary and rapidly; adding, deleting or modifying as required to meed changing demands, processes, equipments, etc. Fixed mechanization such as conveyors and tilt tray sorters are very expensive to modify and with air lines, control wiring, power wiring, and heavy weight construction, extremely time consuming. The invention is easily and quickly reconfigured. The lightweight modular construction and integrated on-board power and controls allows same day modifications to be made. After modification the system map in the MICRO is quickly updated and the system is on line again. Many potential users who require this type of flexibility but have not installed typical automation will now be able to add automation into their facilities.

k) Commercial/government/military/international: Applications include domestic and international users of all types.

The operative features of the invention follow along with a comparison to conveyor and tilt tray sorters.

a) Cost: Both initial cost and long term cost is much less than conventional systems. The system uses low cost monotrack. There are no rollers. The track is injection molded and requires comparitively, no assembly. On the TV units required to meet thruput rates need to be purchased. Conveyors require rollers on three inch centers over the entire length of the system regardless of rates. Integrated controls powered from the monotrack eliminate the need for expensive power and data wiring and allow for fast installation. With less moving parts maintenance is low and with 100 percent backup provided by multiple units, TV/SV,s may be removed from the track for maintenance without shutting down operations. Conveyor is very expensive in comparison. The equipment is costly due to the number of motors and rollers. The installation is expensive due to power and control wiring and components, air piping and extensive grooming and testing. Maintenance is required on a daily basis and a single failure can bring the entire system down. With all the parts that can fail it is very expensive to carry adequate spares. Each divert point requires an expensive piece of equipment, photoeyes, solonoids, wiring and control logic I/O. Heavy duty mounting legs are required to support the weight of the equipment, not the product moving on it.

Tilt tray sorters are also very expensive in comparison. A single drive chain is used for the entire length of the system which is always a single continuous loop. Since maximum speed is limited due to the package trajectory many carriers must be used to meet rates. A tip device is required for each tip point. The system needs to be ruggedly designed and heavy to support the huge pull placed on the single chain by its own weight and friction and not by the product.

b) Weight: The monotrack sections are 80 to 90 percent lighter than conveyor or tilt tray sorter track and chain. This means MT may be installed by less people, much faster and in areas which could not accomadate conveyor or sorters. Supports may be of lighter less expensive constructions.

c) Noise: The TV/SV,s ride on polyurethane wheels which have very quiet high quality bearings. They are virtually noise free. Conveyors use many rollers with low quality noisy bearings which must all turn constantly. In many conveyor installations it is necessary to wear hearing protection which is bothersome and unsafe. Tilt tray sorters are less noisy than conveyor but due to the large chain, large drive motor and many carriers produce a noise level which is irritating over time.

d) Integrated conveyance/sortation controls/power: Once power is applied to the track the system is ready to run. The TV/SV,s provide both reliable transport and product diversion eliminating the need for expensive package divert equipment and providing unlimited and totally flexible and reconfigurable divert points throughout the system layout. Conveyors require expensive controls, air piping, power and control wiring and many different types of transition equipment. For example, to divert an item a pop-up or pusher or other type of equipment must be attached to the conveyor. This produces all types of expense and potential for errors and reduces reliability and adds to maintenance. The conveyor diverter may not work well for every product size especially small light items. Material on the conveyor may have to be skewed to one side of the conveyor to allow the diverter to work. Boxes dragging the side get caught and jam or reduce the required spacing (spacing belt required prior to divert) resulting in a system shutdown. This invention eliminates all these common problems which users live with every day. Once an item is loaded onto the drop tray it is transported directly to its destination and diverted by the action of the tray dropping. The drop tray handles all size items equally well and is one of the most reliable positive diversion techniques.

e) 45 degree incline/decline: The invention will traverse a 45 degree incline or decline while keeping the product level. Conveyors and tilt tray sorters are limited to 15 degrees. This feature provides a 75 percent savings in floor space used for incline/decline when compared to conveyor/tilt tray sorters.

f) Drop tray: The drop tray action eliminates the package vaulting, typical of center pivoted tilt trays, which may cause packages to tumble. The drop tray drops from one side allowing the package to slide naturally off of the tray. There is no need for a tilt solonoid at each divert since the TV/SV,s have on board drop release controls. This provides total freedom in the quantity and location of drop points in the system at no additional cost. In comparison to conveyor type diverts, the drop tray is much more effective. Product divert is guaranteed regardless of item size and weight. The TV/SV can travel into spurs and slow down prior to a group of diverts. A sorter or conveyor must maintain its speed in the system which is limited due to item trajectory when a tray is tilted. Since a sorter needs speed and many carriers to meet throughput, divert throats must be large to accept the items. This invention may divert into very small and close diverts due to its ability to change speed. By increasing speed on the main system paths, well above the limits of conveyor and tilt tray sorters. thruput rates may be met with a minimum of TV/SV,s. As speed of tilt tray sorters or conveyors increase divert reliability decreases while system noise and maintenance increase dramatically.

g) Long distance travel: The invention covers long distances at very low cost. The monotrack sections and cost to support and install them is much less than conveyor which requires many motors, expensive installation, and sufficient room and construction (ceiling, wall, or floor loading). The high speed capability of the TV allows much faster transport which is critical in many applications.

h) Modular standard componentry: The invention requires very few types of equipment to meet many very diverse requirements. No special designs are required as simple in field modification of straights or curves will allow any configuration requirement to be met. For example, once a straight or curve is cut to desired length or angle and mounting/coupling holes drilled (with supplied template) the sections may be installed. The inventions standard track to track power/data connector/cables may still be used on modified sections however they are longer.

i) Reliability/maintainability/availability: The invention uses very few moving parts to accomplish material movement. Since each TV has on board controls and intelligence there is not need for duplication of controls at each divert or decision point as is the case with conveyors or tilt tray sorters. Since each TV/SV unit is self contained, the failure of a single unit in a multi-unit system only reduces total system througput capacity. The down unit may be removed from the system allowing the other units to carry the load. In a conveyor or tilt tray sorter system a single point of failure such as a motor results in a total shutdown until it is repaired. Units may also be removed for maintenance which also increases system availability. Maintenance need not be accomplished during off hours making 24 hour uninterupted operation a reality.

j) Energy efficiency: With no need to power hundreds of motors and thousands of rollers as is the case with conveyor, the invention is extremely power efficient in comparison. Only the units needed to accomplish the days thruput need to be running on the system. Only the power needed to move the product is required by the system whereas with conveyors, all the motors and controls must run even when thruput rates are low.

k) Thruput: The system is ideal in relatively low thruput applications since only the number of TV,s and SV,s required need to be purchased. Additional vehicles may be easily and rapidly added to the system as rates increase. Conveyor systems require all the rollers and motors and controls regardless of thruput rates. In high thruput applications the high speed main path with lower speed spur design allows rates to be met. The TV,s run at much higher speed than conveyor or sorters due to its unique design which allows the units to slow down prior to diverting into a spur.

I claim:

1. A monotrack conveyor apparatus comprising: at least one conveying unit for riding on a track, said unit comprising at least one drive wheel for drivingly engaging a surface of said track, at least one stabilizing wheel for engaging another surface of said track, and an article carrying means on said unit for carrying articles to be conveyed, said article carrying means comprising a tray means pivotally mounted on upper portion of said unit, a locking means for selectively locking said tray means so as to prevent pivotal movement thereof and for selectively unlocking said tray means so as to enable pivotal movement of said tray means to either side of said track, and a key means connecting said upper portion of said unit to a lower portion of said unit at opposite ends of said unit, wherein when the upper portion of one of said opposite ends of said unit is lifted off of the lower portion at said one opposite end, the key means at the other end of said opposite ends prevents said upper and lower portions of said unit at said other opposite end from disengaging.

2. A monotrack conveyor apparatus according to claim 1, wherein said track comprises electric data and supply means for supplying said unit with power and data signals.

3. A monotrack conveyor apparatus according to claim 1, wherein said track comprises a main track and a branch track, and a divert module for diverting said unit from said main track to said branch track.

4. A monotrack conveyor apparatus according to claim 1, wherein said unit comprises a towing vehicle arranged in a train with a plurality of slave vehicles.

5. A monotrack conveyor apparatus according to claim 1, wherein said track comprises a plywood vertical core surrounded by molded plastic.

* * * * *